US006462589B2

United States Patent
Taylor

(10) Patent No.: US 6,462,589 B2
(45) Date of Patent: Oct. 8, 2002

(54) BUS CAPTURE CIRCUIT FOR SINGLE-ENDED AND DIFFERENTIAL SIGNALS

(75) Inventor: Kevin Taylor, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/990,751

(22) Filed: Nov. 16, 2001

(65) Prior Publication Data

US 2002/0060588 A1 May 23, 2002

Related U.S. Application Data

(60) Provisional application No. 60/249,935, filed on Nov. 17, 2000.

(51) Int. Cl.[7] .................................................. H03K 3/00
(52) U.S. Cl. ........................................ 327/108; 327/563
(58) Field of Search ................................ 327/560–563, 327/108, 63, 65, 261; 326/82, 86

(56) References Cited

U.S. PATENT DOCUMENTS

| 5,701,331 | A | * | 12/1997 | Hunt ........................... 327/563 |
| 5,889,419 | A | * | 3/1999 | Fischer et al. ............... 327/403 |
| 5,973,515 | A | * | 10/1999 | Marbot et al. ............... 327/563 |
| 6,259,300 | B1 | * | 7/2001 | Yasuda et al. ............... 327/563 |
| 6,320,406 | B1 | * | 11/2001 | Morgan et al. ................ 326/14 |

* cited by examiner

Primary Examiner—Toan Tran
(74) Attorney, Agent, or Firm—Thomas F. Lenihan

(57) ABSTRACT

A circuit for acquiring a differential signal and a single-ended signal from a differential signal bus generates a differential output strobe signal and a single-ended strobe signal. A differential amplifier, first and second single-ended amplifiers, and a logic circuit cooperate to produce a digital logic output signal that exhibits an active edge that always occurs later in time than an active edge of the differential output strobe signal.

8 Claims, 6 Drawing Sheets

BUS CAPTURE CIRCUIT FOR SINGLE-ENDED AND DIFFERENTIAL SIGNALS

This application claims the benefit of Provisional application Ser. No. 60/249,935, filed Nov. 17, 2000.

FIELD OF THE INVENTION

The subject invention generally concerns the field of circuitry for receiving signals from a digital signal bus, and specifically concerns the field of circuitry employing both a differential receiver circuit and a single-ended receiver circuit to capture a differentially driven signal from a digital signal bus.

BACKGROUND OF THE INVENTION

In modern digital electronic equipment and instruments, it may be necessary for a receiving agent to employ both a differential receiver circuit and a single-ended (i.e., ground-referenced) receiver circuit to capture a differentially driven signal from a digital signal bus. For example, the use of a single-ended receiver circuit is advantageous where the differential bus driver circuit driving the digital bus is a tri-state device, and when and the output of the bus driver is disabled. In such a condition, the input terminals of the differential receiver are held to the same voltage level, which causes its output signal to oscillate. The operation of any edge-triggered circuitry downstream from the differential receiver will be adversely affected by this oscillating output signal. In contrast, the single-ended receiver circuit will not oscillate because its input terminals will not see the same voltage level for any appreciable amount of time.

While use of the single-ended receiver is advantageous in the above-described (i.e. tri-stated) situation, the operation of the differential receiver circuit is superior when data is being driven onto the bus. In such a case, the differential output signal should be used to properly latch data within its specified time window.

Unfortunately, when working with both a differential version and a single-ended version of the same signal, some timing problems can result. These timing problems arise because the single-ended switching point of the signal is unpredictable with respect to the differential switching point, for reasons to be explained in detail below. When the output signals of these two receivers interact in a given system, the above-mentioned timing problems can cause the generation of glitches and other asynchronous anomalies.

What is needed is a circuit that will deterministically locate the output signal of a single-ended receiver with respect to the output signal of a differential receiver, to allow the differential and single-ended output signals to interact in a predictable manner within a given system.

SUMMARY OF THE INVENTION

A digital signal receiving circuit employs both a differential receiver circuit and a single-ended receiver circuit to capture a differentially driven signal from a digital signal bus. The output signal of the differential receiver circuit and the output signals of first and second single-ended receiver circuits are coupled to a logic circuit for producing a digital logic output signal exhibiting a substantially stable timing relationship with respect to the output signal of the differential receiver circuit. The logic circuit comprises an AND-OR circuit arrangement for producing a strobe signal exhibiting an active edge that always occurs later in time than an active edge of the differential circuit.

DETAILED DESCRIPTION OF THE EMBODIMENTS

Figure 1:
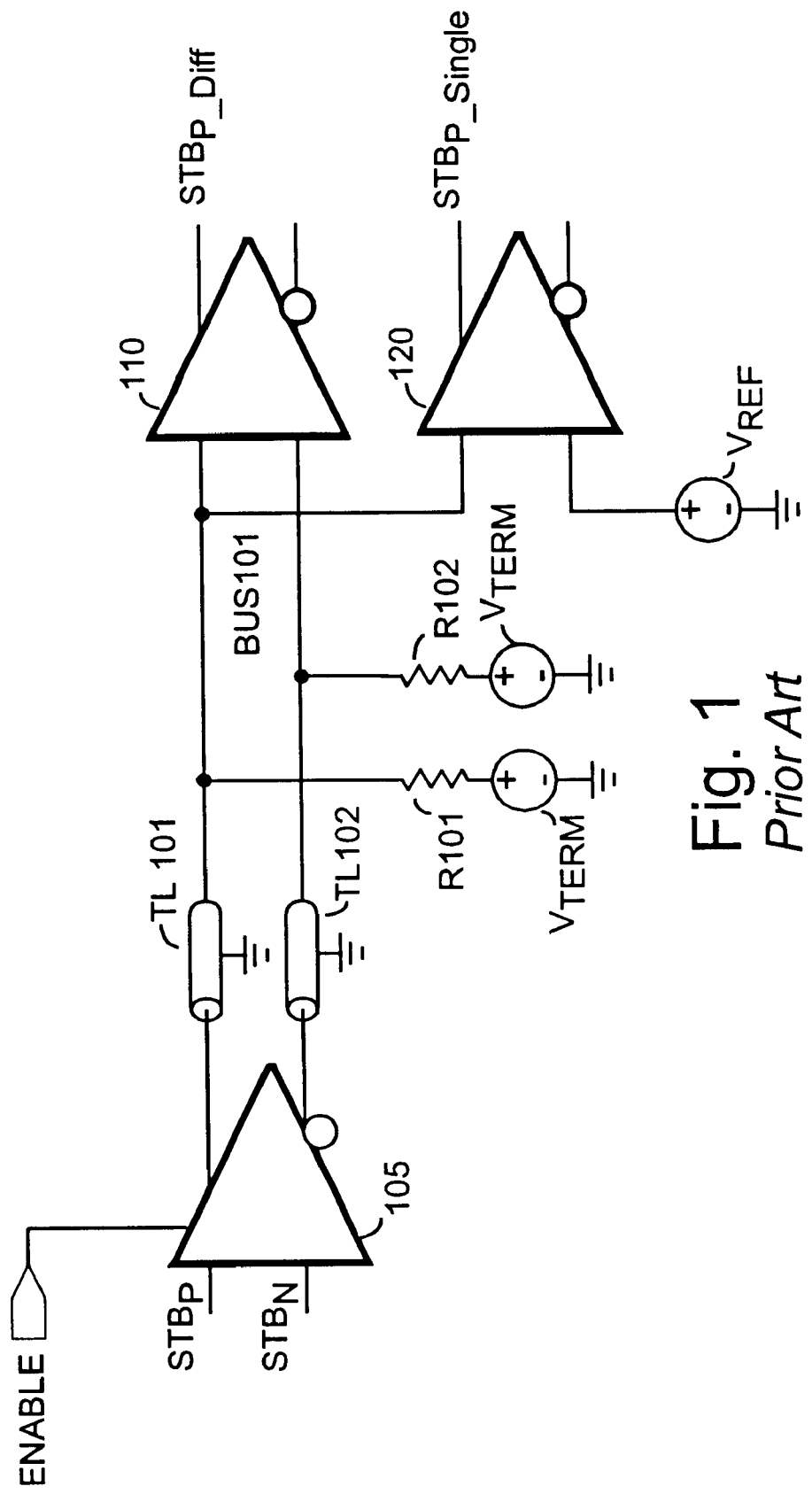
FIG. 1 is a simplified schematic of a prior art circuit for receiving the same signal in both single-ended form and in differential form.

FIG. 1 shows a prior art circuit topology including a differential bus driver amplifier 105 applying a differentially driven strobe signal to a digital signal bus BUS 101, and capturing it in a receiving circuit employing both a differential receiver 110 and single-ended receiver 120. Bus 101 may comprise a pair of transmission lines TL101 TL102. For purposes of the following explanation, one should assume that the voltage level of $V_{REF}$ is centered between the output-high OH and the output-low OL voltage levels of differential bus driver amplifier 105. Also assume $V_{TERM} > V_{OH}$.

Note that when the output enable signal (ENABLE) is disabled in the circuitry of FIG. 1, the inputs to the differential receiver 110 will both be held at the same voltage level: $V_{TERM}$. As noted above, this condition causes the outputs of this receiver to have a tendency to oscillate. The single-ended receiver 120, however, will not oscillate since the input signals to both the $STB_P$ and the $V_{REF}$ inputs will never be identical for an appreciable amount of time.

Assume that a utilization circuit (not shown) is coupled to the output FIG. 1 and includes internal state machine logic that advances state in response to the detection of an active edge of a strobe signal. One skilled in the art will realize that such a utilization circuit should use the single-ended receiver output signal $STB_{P\_Single}$ to advance the state machine logic to avoid glitches caused by the above-mentioned unpredictable oscillations in the output signal of differential amplifier 110.

However, if data is driven onto the bus and it has a very tight timing relationship relative to the differential crossing point of the strobe, then the receiving system should use a differential receiver to capture the strobe. The differential output signal $STB_{P\_Diff}$ can then be used to properly latch the data within the specified timing window.

Figure 2:
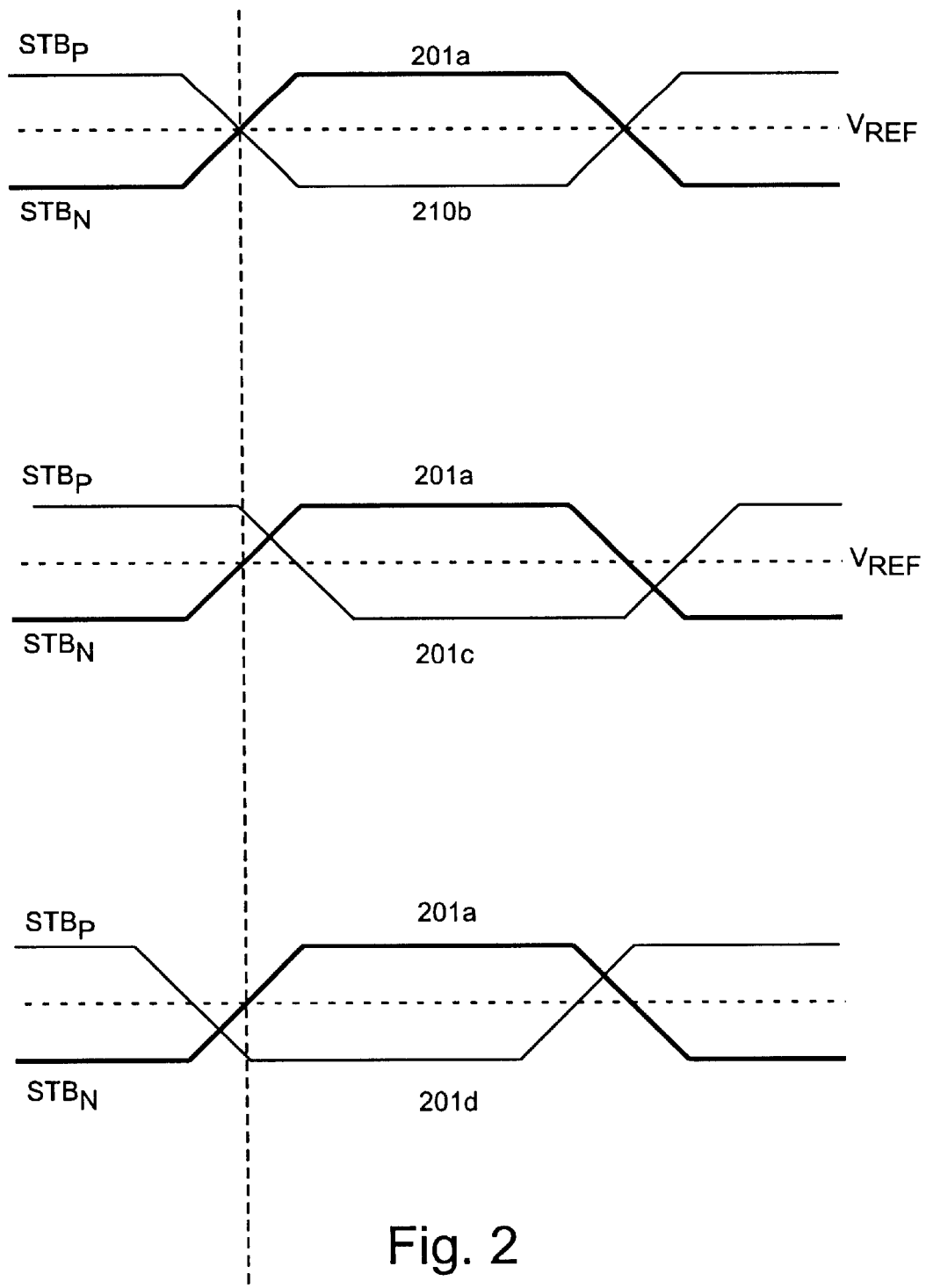
FIG. 2 is an illustration of waveforms that may be useful in understanding a cause of the problem to be solved by the subject invention.

Three pairs of waveforms, (201a 201b), (201a 201c), and (201a 201d), each illustrating a time relationship between complementary strobe signals $STB_P$ and $STB_N$ are shown in FIG. 2. The ideal situation is shown with respect to the top waveform pair comprising waveforms 201a and 201b. Note that waveforms 201a and 201b cross each other exactly at the $V_{REF}$ level.

Unfortunately, it sometime happens that complementary strobe signals $STB_P$ and $STB_N$ are not properly time-aligned. The vertical dotted line of FIG. 2 highlights the fact that strobe signal $STB_N$ has been held in a constant position for purposes of the following explanation. The center illustration of FIG. 2 shows a waveform pair 201a 201c in which strobe signal $STB_P$ is delayed with respect to strobe signal $STB_N$. This condition causes the falling edge of $STB_P$ to cross the $V_{REF}$ level at a point later than the ideal differential crossing point of the strobe pair. The bottom illustration of FIG. 2 shows a waveform pair 210a 201d in which strobe signal $STB_P$ is advanced with respect to strobe signal $STB_N$. This condition causes the falling edge of $STB_P$ to cross the $V_{REF}$ level at a point earlier than the ideal differential crossing point of the strobe pair.

Figure 3:
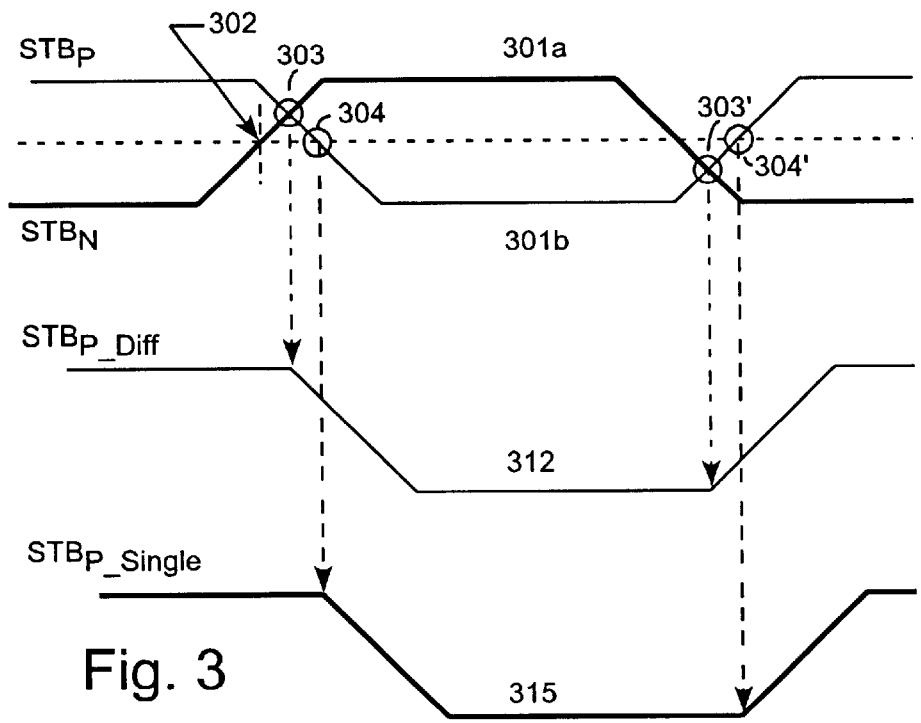
FIG. 3 is an illustration of waveforms that may be useful in understanding a first aspect of the problem to be solved by the subject invention.
Figure 4:
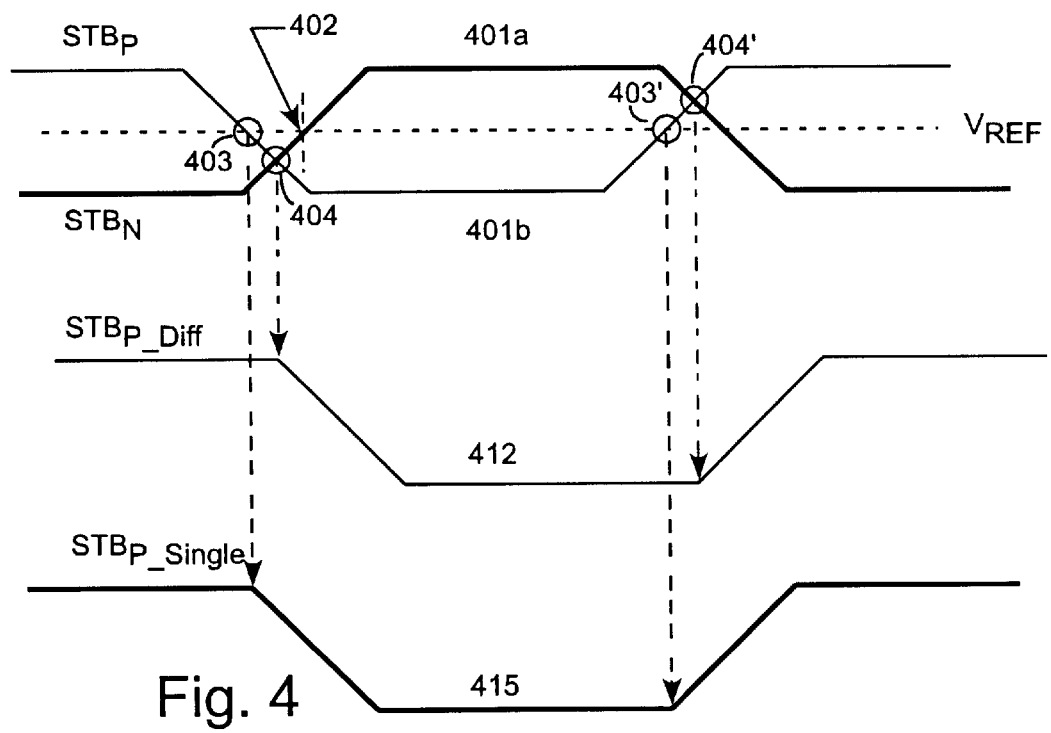
FIG. 4 is an illustration of waveforms that may be useful in understanding a second aspect of the problem to be solved by the subject invention.

The undesirable effects that the center and bottom waveform pairs cause will be explained with respect to FIGS. 3 and 4. FIGS. 3 and 4 are examples showing the single-ended switching point varying in time with respect to the differential switching point. Note that in both figures the falling-edge of the $STB_P$ signal is considered to be the active edge. Referring to waveforms 310a, 310b, 312, and 315 of FIG. 3, strobe signal $STB_P$ is delayed with respect to strobe signal $STB_N$. This situation causes differential amplifier 110 to switch at point 303 instead of ideal switching point 302. The output signal $STB_{P\_Diff}$ of differential amplifier 110 is shown as waveform 312. This situation causes also single-ended amplifier 120 to switch at point 304 instead of ideal switching point 302. The output signal $STB_{P\_Single}$ of single-ended amplifier 120 is shown as waveform 315. Note that in this situation, a timing error has developed between strobe signals $STB_{P\_Diff}$ and $STB_{P\_Single}$.

Referring to waveforms 401a, 401b, 412, and 415 of FIG. 4, strobe signal $STB_P$ is advanced with respect to strobe signal $STB_N$. This situation causes differential amplifier 110 to switch at point 404 instead of ideal switching point 402. The output signal $STB_{P\_Diff}$ of differential amplifier 110 is shown as waveform 412. This situation causes also single-ended amplifier 120 to switch at point 403 instead of ideal switching point 402. The output signal $STB_{P\_Single}$ of single-ended amplifier 120 is shown as waveform 415. Note that in this situation also, a timing error has developed between strobe signals $STB_{P\_Diff}$ and $STB_{P\_Single}$.

With such a timing error between the strobe signals, one can readily see that timing problems will result in a system in which data is strobed by strobe signal $STB_{P\_Diff}$ and single-ended strobed state machine logic is advanced by use of strobe signal $STB_{P\_Single}$. As a result, the updating of the state machine logic will be unpredictable relative to the latching of the data.

For the cases shown in FIGS. 3 and 4, the unpredictability of the single-ended switching point with respect to the differential switching point was caused by skew between the members of the strobe pair. In addition, the differences between switching characteristics of the two receivers themselves can also add to the unpredictability. For example, differential receiver amplifier 110 will most likely switch before single-ended amplifier 120 because the internal difference amplifier of differential receiver amplifier 110 will see a larger voltage delta (i.e., larger voltage change) in a shorter period of time.

Figure 5:
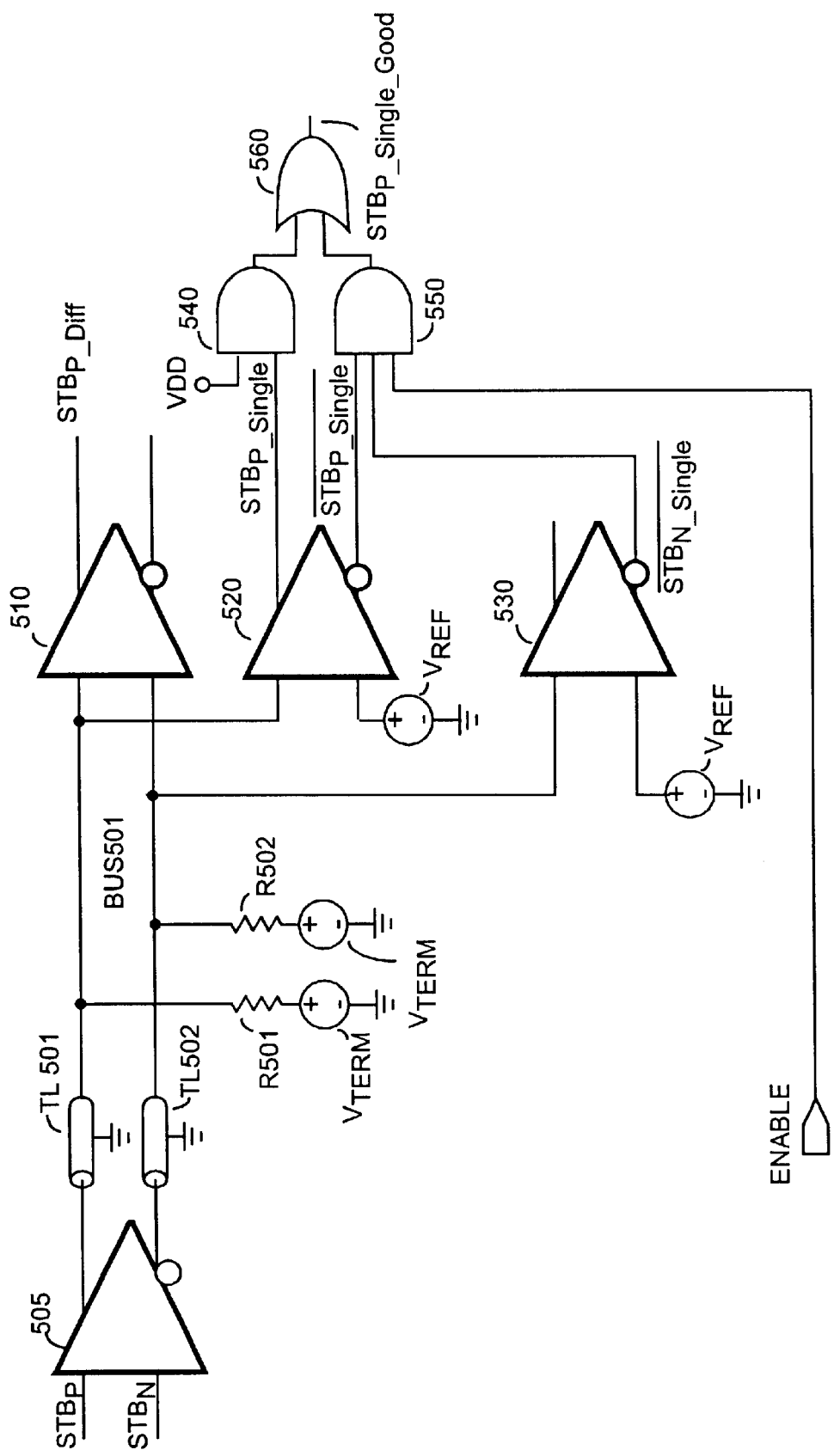
FIG. 5 is a simplified schematic of a circuit for receiving the same signal in both single-ended form and in differential form in accordance with the subject invention.

The subject invention will now be described with respect to FIGS. 5, 6, and 7. FIG. 5 shows a circuit arrangement that allows the output signals of both differential receiver amplifier 110 and single-ended receiver amplifier 120 to safely interact within the utilization circuit. The apparatus of FIG. 5 includes circuitry that predictably locates the output signal of the single-ended amplifier 120 in time with respect to the location of the output signal of differential amplifier 110.

The circuit of FIG. 5 solves the unpredictability problem by using AND-OR logic 540, 550, 560 to delay the single-ended receiver output. The AND-gate 540, 550, 560 of AND-OR logic 540, 550, 560 wait for the laster of the two differential strobe inputs to cross its respective switching threshold. Once both inputs have crossed their switching thresholds, AND-OR logic 540, 550, 560 will allow the $STB_{P\_Single\_Good}$ strobe signal to switch. As a result, the active edge of the $STB_{P\_Single\_Good}$ strobe signal will always occur later in time than the active edge of the $STB_{P\_Diff}$ strobe signal.

Elements 505, TL501, TL502, R501, R502, Voltages sources $V_{TERM}$, and differential amplifier 510 serve the same functions as do similarly numbered elements of FIG. 1 and need not be described again. Single-ended amplifier 520 receives strobe signal $STB_P$, produces strobe signal $STB_{P\_Single}$, and its complement strobe signal $STB_{P\_Single}$-bar, and applies them to AND-gates 540 and 550 respectively. A second single-ended amplifier 530 receives strobe signal $STB_N$ and in response, produces strobe signal $STB_{N\_Single}$ (not used) and its complement strobe signal $STB_{N\_Single}$-bar. Strobe signal $STB_{N\_Single}$-bar is applied to AND-gate 550. An enable signal may also be applied to an input terminal of AND-gate 550. The circuit of FIG. 5 uses identical AND-gate structures 540, 550 to ensure equalized propagation delay through AND-OR logic 540, 550, 560 to avoid glitches on the output.

Figure 6:
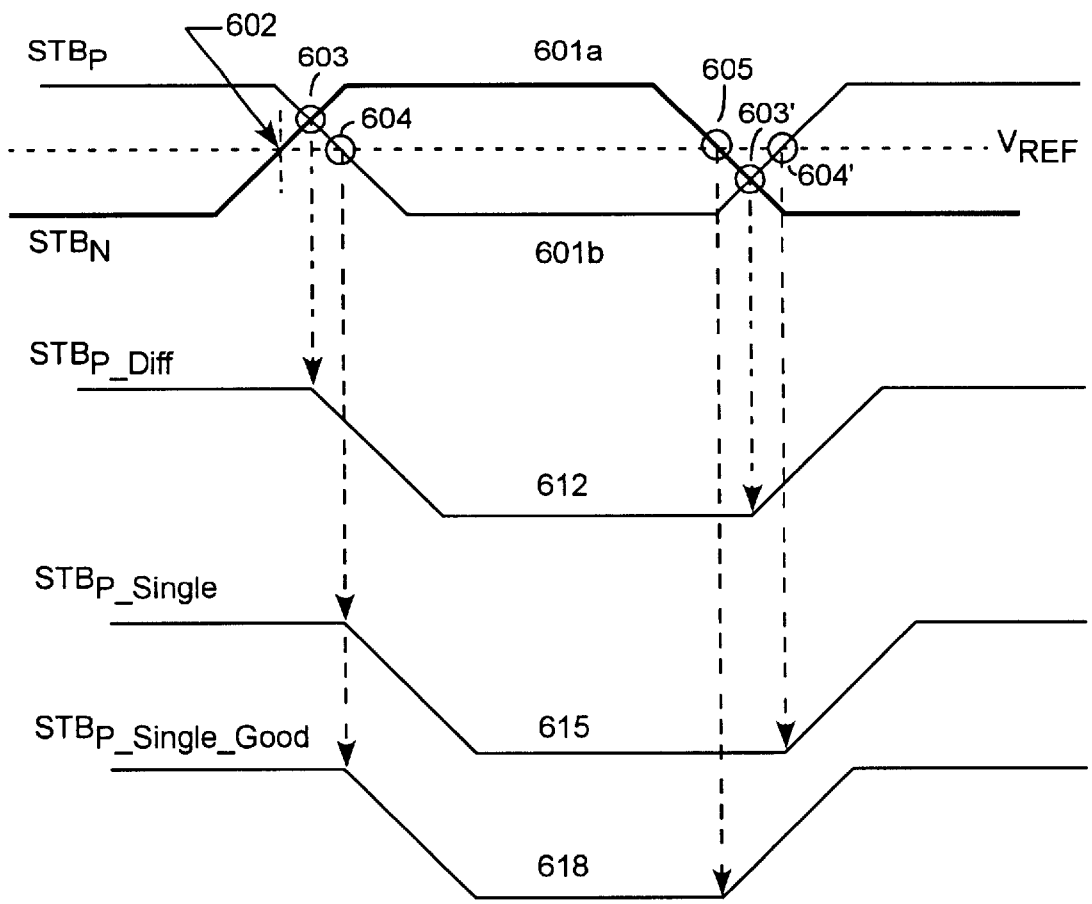
FIG. 6 is an illustration of waveforms showing correction applied by the subject invention with respect to the first aspect of the problem to be solved.

FIG. 6 is similar to FIG. 3 in that is illustrates the condition in which strobe signal $STB_P$, is delayed with respect to strobe signal $STB_N$, however, FIG. 6 also includes a further waveform 618 representing the output signal $STB_{P\_Single\_Good}$ of AND-OR logic 540, 550, 560.

Figure 7:
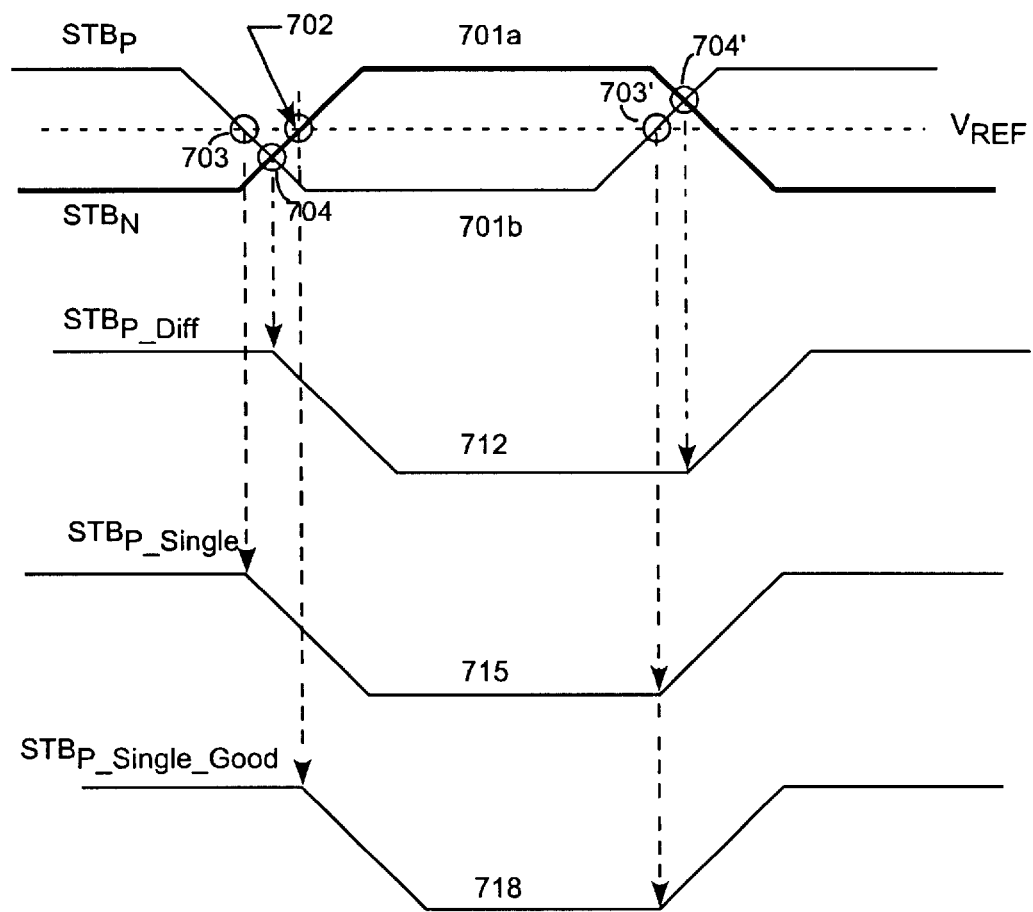
FIG. 7 is an illustration of waveforms showing correction applied by the subject invention with respect to the second aspect of the problem to be solved.

FIG. 7 is similar to FIG. 4 in that is illustrates the condition in which strobe signal $STB_P$, is advanced with respect to strobe signal $STB_N$, however, FIG. 7 also includes a further waveform 718 representing the output signal $STB_{P\_Single\_Good}$ of AND-OR logic 540, 550, 560. It is important to note that strobe signal $STB_{P\_Single\_Good}$ of both FIGS. 6 and 7 always occurs later in time than the active edge of the $STB_{P\_Diff}$ strobe signal. Thus, the unpredictability of location of strobe signals with respect to each other has been eliminated.

It is noted that the subject invention is useful in test and measurement instruments such as logic analyzers and oscilloscopes for analyzing signals from circuits under test. It is herein recognized that this subject invention is also useful in general digital circuit applications involving the generation of single-ended and differential versions of the same digital signal.

While the invention has been described with respect to strobe signals, it is herein recognized that it is also useful for generating stable single-ended and differential versions of other digital signals from the same source signal.

For purposes of explanation, it was assumed that the falling edge is the active edge for both the $STB_{P\_Diff}$ and $STB_{P\_Single\_Good}$ signals. However, one skilled in the art will realize that the circuit can be easily modified to process rising edges instead falling edges.

What is claimed is:

1. A circuit for acquiring a differential signal and a single-ended signal from a differential signal bus, comprising:

a differential amplifier coupled to said bus for receiving a complementary pair of signals and producing a differential output signal;

a first single-ended amplifier coupled to said bus for receiving one signal of said complementary pair of signals, and producing a first and second single-ended output signals;

a second single-ended amplifier coupled to said bus for receiving the other of said complementary pair of signals, and producing a third single-ended output signal; and a digital logic circuit coupled to receive said first, second, and third single-ended output signals, and producing a digital logic output signal in response thereto; wherein said digital logic circuit causes said digital logic output signal to exhibit an active edge that occurs later in time than an active edge of said differential output signal.

2. The circuit of claim 1 wherein said digital logic circuit is an AND-OR circuit.

3. A circuit for acquiring a differential signal and a single-ended signal from a differential signal bus, comprising:

a differential amplifier coupled to said bus for receiving a complementary pair of signals and producing a differential output signal;

a first single-ended amplifier coupled to said bus for receiving one signal of said complementary pair of signals, and producing a single-ended output signal and a second single-ended signal in response thereto, said second single-ended signal a complement of said first single-ended signal;

a second single-ended amplifier coupled to said bus for receiving the other of said complementary pair of signals, and producing a third single-ended output signal, said third single-ended signal being a complement of said other of said complementary pair of signals;

a first AND-gate coupled to receive said first single-ended signal and a high logic level signal and producing a first logic signal;

a second AND-gate coupled to receive said second and third single-ended signals, and producing a second logic signal; and an OR-gate coupled to receive said first and second logic signals and producing an output signal.

4. The circuit of claim 3 wherein said second AND-gate includes a further input terminal for receiving an enable signal.

5. A logic analyzer, comprising:

a bus for receiving a complementary pair of signals from a circuit under test;

a differential amplifier coupled to said bus for receiving said complementary pair of signals and producing a differential output signal;

a first single-ended amplifier coupled to said bus for receiving one signal of said complementary pair of signals, and producing a first and second single-ended output signals;

a second single-ended amplifier coupled to said bus for receiving the other of said complementary pair of signals, and producing a third single-ended output signal; and a digital logic circuit coupled to receive said first, second, and third single-ended output signals, and producing a digital logic output signal in response thereto; wherein said digital logic circuit causes said digital logic output signal to exhibit an active edge that occurs later in time than an active edge of said differential output signal.

6. The circuit of claim 5 wherein said digital logic circuit is an AND-OR circuit.

7. A logic analyzer, comprising:

a bus for receiving a complementary pair of signals from a circuit under test;

a differential amplifier coupled to said bus for receiving said complementary pair of signals and producing a differential output signal;

a first single-ended amplifier coupled to said bus for receiving one signal of said complementary pair of signals, and producing a single-ended output signal and a second single-ended signal in response thereto, said second single-ended signal a complement of said first single-ended signal;

a second single-ended amplifier coupled to said bus for receiving the other of said complementary pair of signals, and producing a third single-ended output signal, said third single-ended signal being a complement of said other of said complementary pair of signals;

a first AND-gate coupled to receive said first single-ended signal and a high logic level signal and producing a first logic signal;

a second AND-gate coupled to receive said second and third single-ended signals, and producing a second logic signal; and an OR-gate coupled to receive said first and second logic signals and producing an output signal.

8. The circuit of claim 7 wherein said second AND-gate includes a further input terminal for receiving an enable signal.

* * * * *